April 23, 1935.   R. W. LUCE   1,998,936
FASTENING DEVICE
Filed June 13, 1933
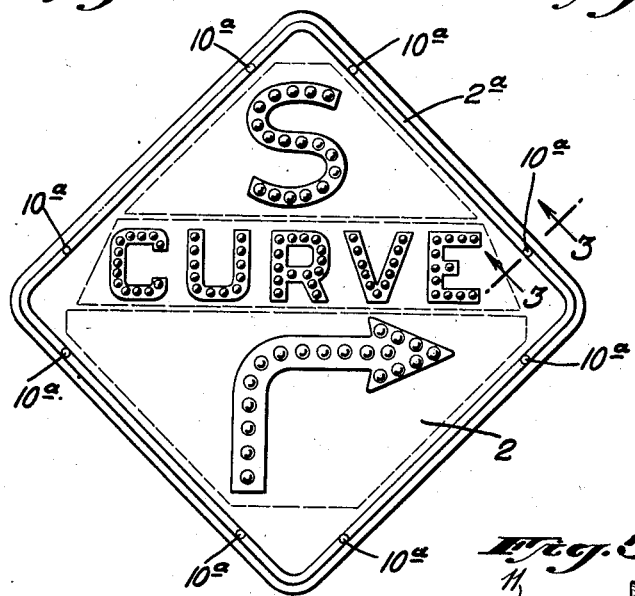
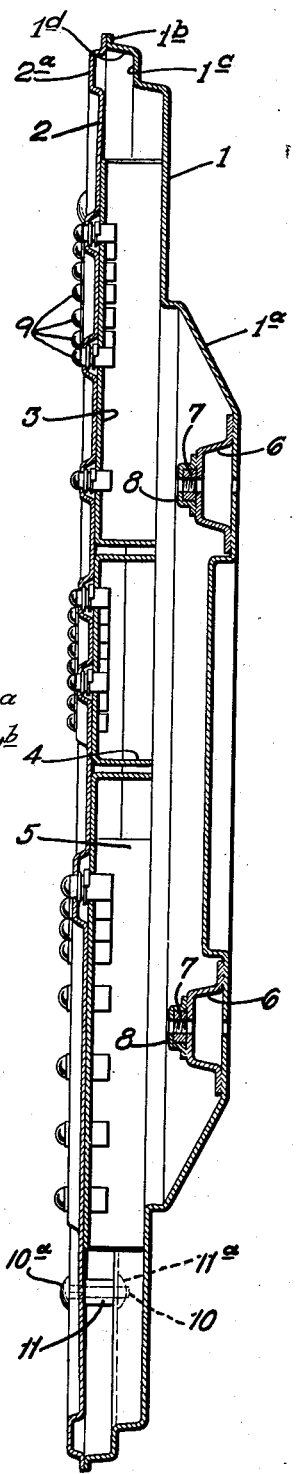
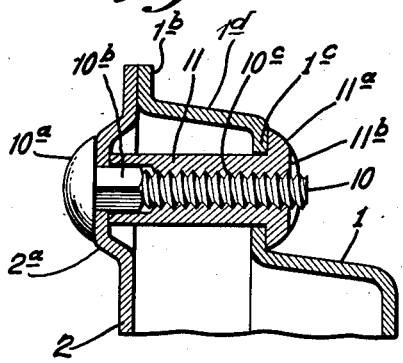
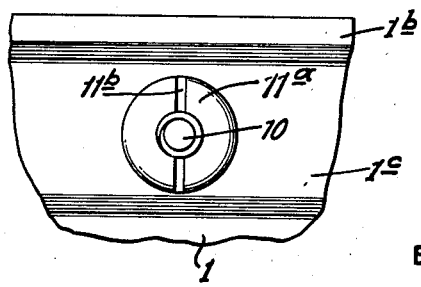
INVENTOR
RICHARD W. LUCE.
BY
HIS ATTORNEY Patented Apr. 23, 1935

1,998,936

UNITED STATES PATENT OFFICE 1,998,936

FASTENING DEVICE

Richard W. Luce, Westfield, N. J., assignor to Signal Service Corporation, a corporation of Delaware Application June 18, 1933, Serial No. 675,563

2 Claims. (Cl. 85—1)

My invention relates to constructions in which two spaced members are fastened together in spaced relation such for example as a dish-shaped member and cover therefor, and my invention particularly comprehends a construction of this character which it is desirable to have so assembled that it may be readily taken apart but which is locked to safeguard against tampering.

While my invention is applicable to securing spaced members irrespective of their constructional environment, it meets a special need in roadside signs, particularly those signs which are made up of a plurality of reflecting units arranged in accordance with the character displayed by the sign. These signs usually include a front and back plate, and a mounting for the reflecting units. The plates are stamped sheet metal and one, usually the back plate, is dished to provide room between the plates to accommodate the mounting means for the reflecting units and also that portion of the units which extends from the rear surface of the front plate. The two plates are secured in such spaced relation and it is necessary that they be capable of ready disassembly by one authorized to do so. Commonly bolts are used for securing the plates of the sign together but bolts do not provide security against pilfering of the reflecting units. While the bolts are drawn up tightly when the sign is assembled so that the frictional engagement between the nut on the bolt and the plate is such as to require a greater force to move the nut than can be applied without the use of a tool, it has been found that unauthorized persons overcome this by compressing or denting the plate which is usually made of light gauge metal around the bolt, as by striking the plate with a rock, the frictional force between the bolt or nut and the plate being thus relieved so that the bolt is readily loosened. In this way many roadside signs are opened and the reflecting units taken and it is an object of my invention to provide a construction which safeguards against such pilfering of reflecting units and the unauthorized separating of other members secured in spaced relation like the front and rear plates of such signs.

In accordance with my invention, provision independent of the force of friction exerted by drawing the two spaced members together is made for locking the fastening device. A clamping action between the two elements of the fastening device on only one of the two members to be secured together sets up the frictional force which serves to lock the fastening device. Even though the two members are forced together, the friction holding the two elements of the fastening device against relative movement will not be disturbed.

In constructions embodying my invention, this relation is obtained by providing aligned openings through the two spaced members which are to be secured together in spaced relation. The opening through one of the members is made larger than the opening through the other. For securing these two members together, a fastening device is provided which includes a bolt having the shank thereof extending through the opening in the member having the smaller opening and the head thereof abutting against the outer side of the member. An internally threaded sleeve having a head formed on one end cooperates with the bolt. The sleeve is threaded on to the bolt and extends through the member having the larger opening. The distance between the head of the sleeve and the end thereof is such that the members to be secured together must be slightly compressed or drawn together so that the end of the sleeve will abut against the inner surface of the member having the smaller opening and against the outer surface of which the head of the bolt abuts. This member is thus clamped between the end of the threaded sleeve and the head of the bolt and the force exerted by the clamping action serves frictionally to lock the sleeve against relative movement with respect to the bolt. Thus, while there is a force exerted by the bolt tending to draw the two spaced members together, there is a separate and distinct locking force resulting from the clamping action of the head of the bolt and the end of the threaded sleeve. There is no way in which this force can be relieved except by the use of appropriate tools.

In one form of construction embodying my invention, the shank of the bolt is provided with two sections, a squared section adjacent the head of the bolt and a threaded section. The squared section of the bolt is received in a squared complementary opening in one of the members and the threaded section of the bolt extends between and through the opening in the other member. The end of the threaded sleeve opposite to that on which the head is formed, and which is adapted to cooperate with the head of the bolt in clamping one of the members to provide a locking frictional force, is recessed to receive the squared section of the shank of the bolt. The extreme end of the sleeve has a pair of helical slots cut therein to form resilient spring elements on the end which act in the capacity of lock washers. In the assembled position, these spring elements serve to increase the locking force exerted by the end of the sleeve abutting against the surface of one of the spaced members. The head on the opposite end of the sleeve is slotted similar to a machine screw, and adapted to receive a tool. In the securing or fastening position, the end of the shank of the bolt extends through the head on the sleeve and interrupts the slot in the head. In this position there are two separated slots and a special tool is required to loosen this fastening device. In roadside signs this form of fastening device provides security against the usual malicious pilfering of reflecting units; it also provides a fastening device which is readily loosened by the use of appropriate tools for the purpose of repair or replacement.

A construction embodying my invention is illustrated in the accompanying drawing and described below. A clearer understanding of my invention may be had from this specific description taken in conjunction with the illustration which includes five figures as follows:

Fig. 1 is a front elevation of a sign embodying the fastening device of my invention;

Fig. 2 is a central sectional elevation of the same;

Fig. 3 is an enlarged, sectional elevation taken along the line 3—3 of Fig. 1 and showing in detail the fastening device as it is related to the sign;

Fig. 4 is a fragmentary, rear elevation of the parts shown in Fig. 3; and

Fig. 5 is an elevation of one element of the fastening device.

While I have illustrated my invention in a roadside sign in which it has special application to provide security against unlicensed opening of such signs and the pilfering of the reflecting units, it is by no means limited to such application.

The sign shown in the drawing is one that includes a series of reflecting units grouped and arranged in the form of intelligible characters and which are adapted to reflect light falling thereon. This sign includes a rear plate 1, a front plate 2 and three reflecting-unit supporting plates 3, 4 and 5, there being a reflecting-unit supporting plate for each of the characters displayed by the sign, that is, one for the character "S", one for the word "Curve", and one for the bent arrow. The rear plate 1 is dish-shaped and acts in the capacity of a mounting plate. The dish shape of the rear plate provides space for the reflecting-unit mounting plates and also reinforcement for supporting the sign in the mounted position, the frusto-conical section 1a of the plate providing such reinforcement. At diametrically opposite points, along the vertical diagonal of the sign, two mounting caps 6 are secured to the inner surface of the base of the frusto-conical section of the rear plate. On these caps a nut 7 is mounted which is held to the cap by a strap 8. Mounting bolts extend through the openings in the rear plate and are received in the nuts 7. The caps 6 serve to distribute the force exerted by drawing up the mounting bolts over a large area of the plate.

The front display plate has the characters to be displayed by the sign embossed thereon and a series of openings along the center line of the embossed characters. This plate is in effect a cover plate for the dish-shaped rear plate. The extreme outer edge of this plate coincides with and abuts against the outwardly extending edge flange 1b of the plate 1. Adjacent this outer edge of the front plate there is formed an embossed border 2a. This embossed border is opposite to a shoulder 1c formed in the rear plate. Eight aligned openings through the border section 2a of the front plate and the shoulder section 1c of the rear plate form the openings for the fastening devices which secure the plates of the sign together. The dish-shape of the rear plate provides a spacing wall 1d which serves to maintain the front plate and the rear plate proper on which the reflecting-unit supporting plates are mounted in spaced relation.

Between the plates, in the assembled sign, the reflecting unit supporting plates 3, 4 and 5 are clamped, one above the other. Each of these supporting plates has a series of openings corresponding to the character of the sign behind which it is mounted and reflecting units 9 are mounted in these openings. The ends of these reflecting units extend through the corresponding openings in the front plate along the center line of the embossed characters on the front plate. The reflecting unit supporting plates are positioned in the sign by virtue of the reflecting units acting as dowels and these plates are secured in the sign by the clamping action of the front and rear plates when secured together.

The two plates are secured together by the special fastening device forming a part of this invention and providing a construction which, with proper tools, is readily taken apart for replacement and repair but which provides ample security against the ordinary, common, malicious, unlicensed opening of such signs and the pilfering of the reflecting units. This fastening device includes a bolt 10 having a head 10a in the form of a section of a sphere, the surface of which is unbroken. The shank of the bolt includes a squared section 10b adjacent the head of the bolt, and a threaded section 10c. One such bolt is received in each one of the openings through the border section 2a of the front plate 2. The holes in this plate are squared and complementary to the squared section 10b of the shank of the bolts which are received therein. The heads of the bolts abut against the outer surface of the plate. The openings through the shoulder 1c of the rear plate 1 are larger than the openings through the front or cover plate and are circular. The shanks of the bolts are sufficiently long to extend through of the rear plate. Cooperating with each bolt there is an internally threaded sleeve 11 threaded on the bolt and on one end of which there is formed a head 11a in the form of a section of a sphere. The head 11a of the sleeve abuts against the outer surface of the shoulder 1c. The opposite end of the sleeve is recessed to receive the squared section 10b of the shank of the bolt. A pair of helical slots are cut through the sleeves at the end thereof to form diametrically opposite spring elements 11c which extend beyond the end of the sleeve and which act in the capacity of a lock washer. The length of the sleeve is slightly less than the normal distance between the outer face of the shoulder 1c and the inner face of the border section 2a, with the result that a slight compression of the two plates being joined or a slight bending of the spacing wall 1d is necessary for the sleeve to abut against the inner surface of the front plate. In this condition the resilient elements 11c are compressed axially of the sleeve and the front plate is firmly clamped between the head of the bolt and the end of the sleeve. The clamping action of the end of the sleeve and the head of the bolt on the front plate and the action of the resilient elements 11c set up a frictional force which resists relative movement between the threaded sleeve and the bolt, which force is independent of the frictional force set up by drawing the two plates together. If the frictional force arising from drawing the two plates together is relieved by inwardly distorting the wall of the shoulder 1c away from the head 11a of the sleeve, there still remains the frictional grip of the end of the sleeve and the inner face of the bolt head 10a upon the opposite sides of the border 2a.

The shank of the bolt is made long enough to extend through the two plates and through the head on the end of the sleeve. When the sleeve is drawn up tightly and the end of the bolt extends through the head thereof the bolt interrupts the tool slot 11b in the head of the sleeve. With the slot so interrupted, the ordinary screwdriver can not be used to turn the sleeve relative to the bolt, but a special bifurcated tool is necessary for removing the sleeve from the bolt. It will be apparent that this construction effectively resists attempts to open such signs either without tools or with the ordinary tools usually available.

Obviously, various changes may be made by those skilled in the art within the principle and scope of my invention as expressed in the appended claims.

I claim:

1. A fastening device for securing two members together against spacing means therebetween which comprises a bolt the shank of which includes a polygonal section adjacent the head and a threaded circular section, and an internally threaded sleeve adapted to be threaded on to said bolt and having a slotted head on one end and the opposite end recessed to rotatably receive the polygonal section of the shank of the bolt, the end of the bolt being adapted to extend through the head on the sleeve and interrupt the slot therein.

2. A fastening device for securing two members together against spacing means therebetween which comprises a bolt the shank of which includes a polygonal section adjacent the head and a threaded circular section, and an internally threaded sleeve adapted to be threaded on to said bolt and having a slotted head on one end and the opposite end recessed to rotatably receive the polygonal section of the shank of the bolt, the end of the bolt being adapted to extend through the head on the sleeve and interrupt the slot therein, and axially compressible resilient elements formed on the recessed end of the sleeve.

RICHARD W. LUCE.